Patented July 27, 1948

2,446,049

UNITED STATES PATENT OFFICE 2,446,049

COPOLYMERS OF ISOPROPENYL TOLUENE AND ACRYLATE AND PROCESSES OF PRODUCING SAME

Edward L. Kropa, Old Greenwich, Conn., assignor to American Cyanamid Company, New York, N. Y., a corporation of Maine No Drawing. Application February 13, 1943, Serial No. 475,792

7 Claims. (Cl. 260—84)

This invention relates to polymers of isopropenyl toluene and to processes of producing the same.

Isopropenyl toluene unlike other unsaturated materials does not itself polymerize readily and extremely active catalysts or very high temperatures are generally required to effect polymerization of this substance. Under these conditions low molecular weight polymers are obtained.

An object of this invention is to prepare polymeric materials from isopropenyl toluene.

Another object of this invention is to prepare polymeric materials of high molecular weight.

Another object of this invention is to activate the polymerization of isopropenyl toluene. More specifically it is an object of this invention to activate the polymerization of isopropenyl toluene by means of another polymerizable compound so that it forms an inseparable part of the ultimate product.

Still another object of this invention is to provide processes for the polymerization of isopropenyl toluene with vinyl compounds such as acrylic acid, esters of acrylic acid and the methyl homologs thereof.

These and other objects are attained by polymerizing mixtures of isopropenyl toluene with acrylic acid, methacrylic acid or esters of either acid by heating mixtures thereof as such or mixtures thereof in solution, in emulsion, in dispersions, in various combinations of these, etc.

The following examples in which the proportions are in part by weight are given by way of illustration and not in limitation.

EXAMPLE 1

The following substances in the proportions indicated, together with 0.2% of benzoyl peroxide are sealed in glass tubes and heated at 80° C.:

| Isopropenyl Toulene | Methyl Acrylate | Appearance After Heating for One Week |
|---|---|---|
| Parts | Parts | |
| 80 | 20 | Clear viscous liquid. |
| 60 | 40 | Do. |
| 50 | 50 | Do. |
| 40 | 60 | Slightly opaque solid. |
| 20 | 80 | Opaque solid. |

The sample containing 50 parts of isopropenyl toluene and 50 parts of methyl acrylate is dissolved in acetone and precipitated with alcohol. The polymer may be dried in vacuo. Compression moldings of this polymer are clear. The flow value on a Peakes-Rossi machine indicated a flow point of 126° C. The flow point is a characteristic property of the resin and is the temperature at which the resin flows in one inch within two minutes at a pressure of 1500 pounds per square inch.

EXAMPLE 2

| | Parts |
|---|---|
| Isopropenyl toluene | 1800 |
| Methyl acrylate | 1500 |
| Benzoyl peroxide | 6 |

This composition is heated under reflux for about 21 hours. During this heating interval the temperature rises gradually. After 2 hours the reflux temperature is about 76° C., after 14 hours, 85° C. and after 21 hours, 89° C. The resulting viscous resin solution may be cast and allowed to heat at 100° C. for around 4 days. The resin is dissolved in acetone and precipitated by mixing with the solution with hot water. Conveniently, a Werner-Pfleiderer mixer may be employed. The resin is further kneaded with hot water, dried, cut into small particles with, for example, a rotary impact cutter and vacuum dried.

Clear, colorless moldings are obtained when the resin is injection molded at a temperature of 350–380° F., using a pressure of 33,000 pounds per square inch. Tensile bars of this resin molded by injection possessed a tensile strength of 4840 pounds per square inch (average of 17 determinations), a percentage elongation at break of 1.65% (average of 17 determinations), a flexural strength of 7,745 pounds per square inch (average of 6 determinations) and an Izod impact of 0.187 (average of 6 determinations).

EXAMPLE 3

| | Parts |
|---|---|
| Isopropenyl toluene | 70 |
| Acrylic acid | 30 |

These substances may be copolymerized by heating at 100° C. for approximately 24 hours. The resin thus formed is insoluble in acetone and in ethylene dichloride but it is readily soluble in dioxane.

EXAMPLE 4

| | Parts |
|---|---|
| Isopropenyl toluene | 50 |
| Methyl methacrylate | 50 |

This composition is interpolymerized upon heating at 100° C. for about 5 days. The resulting resin is subsequently sheeted on hot rolls and cut by impact to form a molding powder. Compression moldings of the resulting polymer are glass clear.

EXAMPLE 5

| | Parts |
|---|---|
| Isopropenyl toluene | 150 |
| Acrylic acid | 10 |
| Acrylonitrile | 50 |

This mixture is placed in a suitable reaction vessel such as that described in the above examples and heated at about 80° C. for 24 hours during which time the mixture turns to a viscous pale yellow solution. About 210 parts of ethylene dichloride are gradually added to this mixture and the heating is continued for an additional 48 hours. The product thus obtained may be cut with ethylene dichloride or other suitable solvent to a solid content of about 25% in order that it may be easily used as a coating composition. This material has better adhesion than the polymers of isopropenyl toluene and acrylonitrile alone since the acrylic acid causes the resinous material to adhere more strongly to the metal than does the product not containing any acid groups.

Other polymerizably reactive acids may be used in the same general manner as the acrylic acid, e. g., maleic acid, alpha-methacrylic acid, itaconic acid, aconitic acid, etc.

EXAMPLE 6

| | Parts |
|---|---|
| Isopropenyl toluene | 2386 |
| Acrylonitrile purified by steam distillation in the presence of phosphoric acid | 795 |
| Methyl acrylate | 352 |

These substances are heated together under reflux for about 17 hours and the resulting viscous syrup is cast and maintained at 85° C. for 13 days. The resulting casting was crystal clear.

The resin is broken up and cut by impact. The resulting molding compound is injection molded at a temperature of 365° F. and a pressure of 33,000 pounds per square inch. The moldings are clear and colorless. The following physical data were obtained from such moldings:

*Tensile strength (A. S. T. M.) pounds per sq. in.*

8,350 max.
6,590 min.
7,650 av. (17 determinations)

*Percent elongation*

2.95 max.
2.00 min.
2.46 av. (17 determinations)

*Flexural strength pounds per sq. in.*

12,300 max.
10,800 min.
11,800 av. (4 determinations)

*Impact strength, Izod foot pounds per inch*

0.273 max.
0.204 min.
0.221 av. (4 determinations)

Although polymerization catalysts are not required, they may be utilized if desirable in order to speed up the reaction somewhat. Examples of suitable catalysts are hydrogen peroxide, the organic peroxides, e. g., benzoyl peroxide, phthalic peroxide, succinic peroxide and benzoyl acetic peroxide; fatty oil acid peroxides, e. g., coconut oil acid peroxides, stearic peroxide and oleic peroxide; alcohol peroxide, e. g., tertiary butyl peroxide and terpene oxides, e. g., ascaridole, etc. The very active polymerization catalysts such as boron trifluoride, aluminum chloride, stannic chloride, etc., are quite active with respect to the polymerization of isopropenyl toluene but they are not particularly suitable for use with my mixtures since they tend to polymerize the isopropenyl toluene but have little effect on the acrylic compounds.

Suitable plasticizers may be incorporated into my polymeric materials in order to produce products of varying degrees of flexibility even to the extent of producing rubbery materials. Particularly suitable plasticizers for my resinous materials are dibenzyl ether, dibutyl phthalate, benzyl phenyl amino acetonitrile, the naphthyl alpha-hydroxy isobutyric acid, esters such as the alpha-naphthyl methyl ester, other esters of alpha-hydroxy isobutyric acid, chlorinated rubber, ethyl lactate, tricresyl phosphate, etc.

Acrylic acid, methacrylic acid or any ester of either acid may be copolymerized with isopropenyl toluene in accordance with my invention. Furthermore, mixtures of any of these acrylic compounds may be employed. The acids polymerize most rapidly, but because of the relatively poorer water resistance and electrical properties of the resulting polymers, the uses of the latter are somewhat more limited than with the copolymers of the esters of the acids. Of the esters, methyl acrylate and methyl methacrylate are preferred because the rate of polymerization is higher than with the higher homologs. Examples of other esters of acrylic and methacrylic acids which may be employed in my process are: the ethyl, beta-chlorethyl, propyl, isopropyl, butyl, cyclohexyl, and benzyl esters as well as the higher homologs thereof.

Since acrylonitrile speeds up the polymerization of isopropenyl toluene it may be desirable to employ some acrylonitrile along with the acrylic acid, methacrylic acid or ester thereof. This is especially advantageous if the higher alkyl esters of an acrylic acid be copolymerized with the isopropenyl toluene. From one to ten parts or more of acrylonitrile to ten parts of isopropenyl toluene may be employed for this purpose.

The ratio of the acrylic compound (acrylic acid, methacrylic acid, esters thereof and mixtures thereof) to isopropenyl toluene may be varied from about 1:10 to about 10:1. If the ratio of the acrylic compound to the isopropenyl toluene is greater than about 55:45, opaque products are often obtained. Accordingly, for clear products it is preferable that the ratio be less than 55:45. For clear moldings the optimum ratio of acrylic compound to isopropenyl toluene is between about 40:60 and 55:45.

Moreover, depending on the ratio of ingredients, various polymers may be prepared, two factors being operative to obtain resinous products of definite flow character, viscosity, etc., and these are (1) the ratios used, and (2) the length of the polymer, i. e., the molecular weight.

If the acrylic compound and isopropenyl toluene be polymerized when dispersed in water, it may be desirable to start the reaction with an excess of the acrylic compound. After the polymerization reaction starts i. e., after polymerized nuclei are formed, the isopropenyl toluene polymerizes very rapidly. The reaction may be stopped empirically according to analysis or other convenient means and the uncombined acrylic compound may be recovered from the residue by steam distillation. For producing resins suitable for injection molding it is advantageous to have about 45% of the product combined acrylic acid, methacrylic acid, esters thereof and acrylonitrile.

The softening point of my resinous products varies with the composition, but within the preferred range set forth above, the flow point (A. S. T. M.) is generally between about 100° C. and 140° C.

It is to be noted that the purity of the raw materials influences the speed of the reaction, the extent of polymerization, the molecular weight of the product as well as the strength of the final resin. The speed of the polymerization, however, is more of a function of the ratios of ingredients.

For some purposes part or all of the isopropenyl toluene used according to my invention may be substituted with isopropenyl benzene, isopropenyl xylene, isopropenyl cyanide, isopropenyl amides, etc. The para form of such substances are generally easily obtainable and therefore are of greatest commercial importance, but the ortho and meta forms may also be used.

Isopropenyl toluene may be polymerized either in the presence or absence of acrylic acid, methacrylic acid and esters thereof with one or more of various unsaturated compounds including the following: styrene, the fumaric esters, the maleic esters (e. g., diethyl maleate, diallyl maleate, etc.), the glycol maleates, acrylonitrile, acrolein and methacrolein, etc. Products prepared from the latter two materials may be alkylated with suitable alcohols in the presence of acids. Some unsaturated materials are not suitable for use according to my invention, e. g., itaconic acid esters, vinyl acetate and the like. Methacrylonitrile and methyl isopropenyl ketone may be utilized only to a limited extent.

My polymerization reactions may be carried out in any suitable solvent in which the polymer is soluble, other than ethylene dichloride, e. g., acetone, cyclohexanone, propylene dichloride, carbon tetrachloride, dichlorethyl ether, etc.

When I polymerize isopropenyl toluene with acrylic compounds, emulsified in water, relatively strong emulsifying agents are generally desirable. Any compatible emulsifier which will produce a satisfactory emulsion may be used and may be selected from the following types: diamyl, dihexyl or dioctyl sulfosuccinic esters and salts thereof, salts of alkylated naphthalene sulfonic acids, long chain quaternary ammonium compounds, sulfonated or sulfated higher alcohols, e. g., lauryl sulfate, the salts of the sulfated or sulfonated higher alcohols, sulfonated oils, glycol oleates and linoleates, mineral oil sulfonates, aromatic sulfonates, wax acid soaps, triethanolamine soaps, such as the oleate, monoglycerol linoleates, amino sulfonates and sulfates, ammoniacal or other alkaline caseins, soaps, lecithin, cholesterol, saponin, etc. When the polymerization is carried out in emulsion, the polymer usually is formed as a latex.

Suitable dispersing agents for use in polymerizations in aqueous dispersions include not only polyvinyl alcohol and methyl cellulose, but also various colloidal materials such as gum arabic, gelatin, the hydroxyethyl ether of cellulose, salts of polymeric organic acids, such as acrylic, hydroxy acrylic acids, polymeric water-soluble amides, etc. The low viscosity methyl cellulose suitable for practicing my invention should have a viscosity of about 25–75 centipoises in a 2% aqueous solution, inasmuch as the high viscosity methyl cellulose is almost completely thrown out of solution. When the polymerization is carried out with the reactants dispersed in water, the polymer usually precipitates in the form of irregular granules during the polymerization process, and in some cases a small proportion of polymeric material may be left suspended in the aqueous medium. Under special conditions, spherical products result. In some instances, it may be desirable to employ mixtures of emulsifying agents and dispersing agents as well as mixtures of emulsifying agents themselves or mixtures of dispersing agents themselves.

The isopropenyl toluene and acrylic compound may be polymerized alone or a solvent may be added during or after the completion of the polymerization. Similarly, a non-solvent such as water may be added, together with emulsifying or dispersing agents at any stage of the reaction, and if the polymerization is not complete, it may be continued to the desired point. If the emulsions or suspensions of polymerized material be produced, they may be precipitated as indicated in the preceding examples, or they may be used as such for coating purposes, as in the treatment of paper, textiles, leather and other fibrous materials.

The resins suitable for casting may be cast into special shapes or into tubes, rods, sheets, etc. The tubes, rods and sheets may be sawed, cut or machined into particular shapes. The cast products may also be cut or ground to form a molding material particularly suitable for either injection or compression molding.

Solutions of the polymeric material may be dried on rolls, ground and molded. Solid polymers produced by any of the processes described herein may be mixed with plasticizers, for example in an internal mixer such as a Banbury mixer, sheeted on hot rolls and subsequently calendered, thereby producing sheets of clear, polymeric material.

Various pigments and dyes may be incorporated in my compositions, e. g., Sudan IV, nigrosine, etc.

If desirable, fillers may be included in my compositions, e. g., wood flour, wood fiber, paper fiber, dust clay, zein, glass wool, glass cloth, mica, granite, dust silk flock, cotton flock, steel wool, silicon carbide, paper, cloth, sand, etc. These may be added to the starting materials or to the finished resin.

Moldings of my polymers and materials coated with my polymers are especially suitable for use in the electrical industry, since they have desirable electrical properties for many purposes. Various molded novelties may be produced from my polymers such as spoons, dishes, bottle tops, receptacles of all kinds including ash trays, cigarette cases, as well as for handles, for brushes, doors, drawers, etc. My resinous materials are also suitable in the production of lamp shades, light fixture receptacles or parts thereof, etc. Sheets of my polymeric materials may be used in windows, either alone or associated with glass.

Emulsions and solutions of my polymeric materials may be employed in textile printing processes, as well as in the sizing and finishing of textiles. Paper may be treated with emulsions or solutions of my resinous materials in order to render it repellent to water, grease, etc., as well as to produce insulating materials and the like.

This application is a continuation-in-part of my copending application, Serial No. 391,712, filed May 3, 1941, now Patent No. 2,310,961, issued February 16, 1943.

Obviously many modifications and variations

I claim:

1. A copolymer of a mixture consisting of isopropenyl toluene and an acrylic compound selected from the group consisting of acrylic acid, methacrylic acid, methyl acrylate, and methyl methacrylate, the weight ratio of said isopropenyl toluene to said acrylic compound being between 1:10 and 10:1.

2. A molded article comprising a copolymer of a mixture consisting of isopropenyl toluene and an acrylic compound selected from the group consisting of acrylic acid, methacrylic acid, methyl acrylate, and methyl methacrylate, the weight ratio of said isopropenyl toluene to said acrylic compound being between 1:10 and 10:1.

3. A molded article comprising a copolymer of the mixture consisting of isopropenyl toluene and methyl acrylate, the weight ratio of said isopropenyl toluene to said methyl acrylate being between 1:10 and 10:1.

4. A molded article comprising a copolymer of the mixture consisting of isopropenyl toluene and acrylic acid, the weight ratio of said isopropenyl toluene to said acrylic acid being between 1:10 and 10:1.

5. A molded article comprising a copolymer of the mixture consisting of isopropenyl toluene and methyl methacrylate, the weight ratio of said isopropenyl toluene to said methyl methacrylate being between 1:10 and 10:1.

6. A process comprising copolymerizing a mixture consisting of isopropenyl toluene and an acrylic compound selected from the group consisting of acrylic acid, methacrylic acid, methyl acrylate, and methyl methacrylate, the weight ratio of said isopropenyl toluene to said acrylic compound being between 1:10 and 10:1 and said mixture being in the form of an aqueous dispersion.

7. A process comprising copolymerizing a mixture consisting of isopropenyl toluene and an acrylic compound selected from the group consisting of acrylic acid, methacrylic acid, methyl acrylate, and methyl methacrylate, the weight ratio of said isopropenyl toluene to said acrylic compound being between 1:10 and 10:1 and said mixture being in the form of an aqueous emulsion.

EDWARD L. KROPA.

REFERENCES CITED

The following references are of record in the file of this patent:

FOREIGN PATENTS

| Number | Country | Date |
|---|---|---|
| 786,984 | France | Sept. 14, 1935 |
| 627,037 | Germany | Mar. 6, 1936 |
| 652,276 | Germany | Oct. 25, 1937 |